United States Patent
Proicou et al.

(10) Patent No.: US 11,142,346 B1
(45) Date of Patent: Oct. 12, 2021

(54) SPACE VEHICLE SYSTEM AND PAYLOAD INTERPOSER (PIP) BOARD

(71) Applicant: Triad National Security, LLC, Los Alamos, NM (US)

(72) Inventors: Michael Proicou, Los Alamos, NM (US); Adam Warniment, Los Alamos, NM (US); Paul Stein, Los Alamos, NM (US); Nicholas Dallmann, Los Alamos, NM (US); Daniel Seitz, Los Alamos, NM (US); Logan Ott, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 577 days.

(21) Appl. No.: 15/940,714

(22) Filed: Mar. 29, 2018

Related U.S. Application Data

(63) Continuation-in-part of application No. 15/872,630, filed on Jan. 16, 2018, now Pat. No. 10,981,677, which is a continuation of application No. 14/746,046, filed on Jun. 22, 2015, now Pat. No. 9,878,805.

(60) Provisional application No. 62/016,566, filed on Jun. 24, 2014.

(51) Int. Cl.
| | |
|---|---|
| *B64G 1/10* | (2006.01) |
| *B64G 1/22* | (2006.01) |
| *B64G 1/44* | (2006.01) |
| *B64G 1/42* | (2006.01) |
| *B64G 1/64* | (2006.01) |

(52) U.S. Cl.
CPC .............. *B64G 1/10* (2013.01); *B64G 1/222* (2013.01); *B64G 1/428* (2013.01); *B64G 1/44* (2013.01); *B64G 1/641* (2013.01); *B64G 2001/1092* (2013.01)

(58) Field of Classification Search
CPC .......... B64G 1/10; B64G 1/222; B64G 1/428; B64G 1/44; B64G 1/641
See application file for complete search history.

(56) References Cited

U.S. PATENT DOCUMENTS

| | | | |
|---|---|---|---|
| 3,913,109 A | 10/1975 | Owen | |
| 4,475,111 A | 10/1984 | Gittinger et al. | |
| 4,508,404 A * | 4/1985 | Frawley | H01R 13/629 244/135 A |
| 4,780,727 A | 10/1988 | Seal et al. | |
| 5,040,748 A * | 8/1991 | Torre | B64G 1/641 244/173.3 |

(Continued)

OTHER PUBLICATIONS

Justin M Benedik, "Non-Final Office Action", dated May 27, 2020, U.S. Appl. No. 15/872,630.

(Continued)

*Primary Examiner* — Justin M Benedik
(74) *Attorney, Agent, or Firm* — LeonardPatel PC; Michael Aristo Leonard, II; Sheetal Suresh Patel

(57) ABSTRACT

A payload interposer (PIP) board provides an interface for hosting payloads on a space vehicle platform. Payload development may be performed via the PIP board in a manner that "abstracts" the hardware of the space vehicle from the payload developer. The PIP board may include a host side payload interface connector that connects to a space vehicle and a payload side payload interface connector that connects to a payload. Power, CDH, and other space vehicle functionality may thus be provided to the payload from the space vehicle via the PIP board.

18 Claims, 13 Drawing Sheets

(56) References Cited

U.S. PATENT DOCUMENTS

| | | | | |
|---|---|---|---|---|
| 5,152,482 | A * | 10/1992 | Perkins | B64G 1/22 244/159.4 |
| 5,874,924 | A * | 2/1999 | Csongor | H01Q 1/288 343/789 |
| 5,986,619 | A * | 11/1999 | Grybos | H01Q 1/288 343/853 |
| 7,609,226 | B1 | 10/2009 | MacGahan et al. | |
| 7,817,101 | B2 | 10/2010 | Cowles | |
| 8,730,124 | B2 * | 5/2014 | Behrens | H01Q 1/288 343/895 |
| 8,970,447 | B2 * | 3/2015 | Ochoa | H01Q 11/086 343/881 |
| 9,067,695 | B1 * | 6/2015 | Suh | B64G 1/222 |
| 9,853,353 | B2 | 12/2017 | Judd et al. | |
| 10,250,336 | B1 | 4/2019 | Palmer | |
| 2006/0073723 | A1 * | 4/2006 | Cowgill | H01R 13/6315 439/247 |
| 2007/0125910 | A1 | 6/2007 | Cepollina et al. | |
| 2010/0037932 | A1 * | 2/2010 | Erez | H01L 31/188 136/244 |
| 2010/0319956 | A1 * | 12/2010 | Ballard | B60R 16/0207 174/105 R |
| 2012/0160294 | A1 * | 6/2012 | Phu | H01L 31/188 136/244 |
| 2014/0253410 | A1 | 9/2014 | Dinallo et al. | |
| 2016/0264266 | A1 | 9/2016 | Stone | |

OTHER PUBLICATIONS

Yazan A Soofi, "Notice of Allowance", dated Apr. 20, 2020, U.S. Appl. No. 15/940,816.

Yazan A Soofi, "Non-Final Office Action", dated Feb. 5, 2020, U.S. Appl. No. 15/940,816.

ESTCube-1 Wikipedia p., https://en.wikipedia.org/wiki/ESTCube-1 (last accessed Apr. 24, 2014).

Justin M. Benedik, "Final Office Action", dated Sep. 26, 2017, U.S. Appl. No. 14/746,046.

Justin M. Benedik, "Non-Final Office Action", dated May 18, 2017 for U.S. Appl. No. 14/746,046.

Justin M. Benedik, "Notice of Allowance", dated Nov. 30, 2017, U.S. Appl. No. 14/746,046.

Non-final Office Action issued in U.S. Appl. No. 14/745,763 dated Feb. 10, 2017.

Restriction Requirement issued in U.S. Appl. No. 14/745,763 dated Oct. 4, 2016.

Restriction Requirement issued in U.S. Appl. No. 14/746,046 dated Feb. 14, 2017.

Space Micro MSS-01,02 Medium Sun Sensors Brochure, http://www.spacemicro.com/assets/datasheets/guidance-and-nav/MSS.pdf (May 2, 2014).

The JSON Data Interchange Syntax, http://www.ecma-international.org/publications/files/ECMA-ST/ECMA-404.pdf (last accessed Mar. 29, 2018).

Trinh Vo Dinh, "Final Office Action", dated Jul. 10, 2017, U.S. Appl. No. 14/745,763.

Trinh Vo Dinh, "Notice of Allowance", dated Oct. 12, 2017, U.S. Appl. No. 14/745,763.

Justin M Benedik, "Notice of Allowance", dated Nov. 27, 2020, U.S. Appl. No. 15/872,630.

* cited by examiner

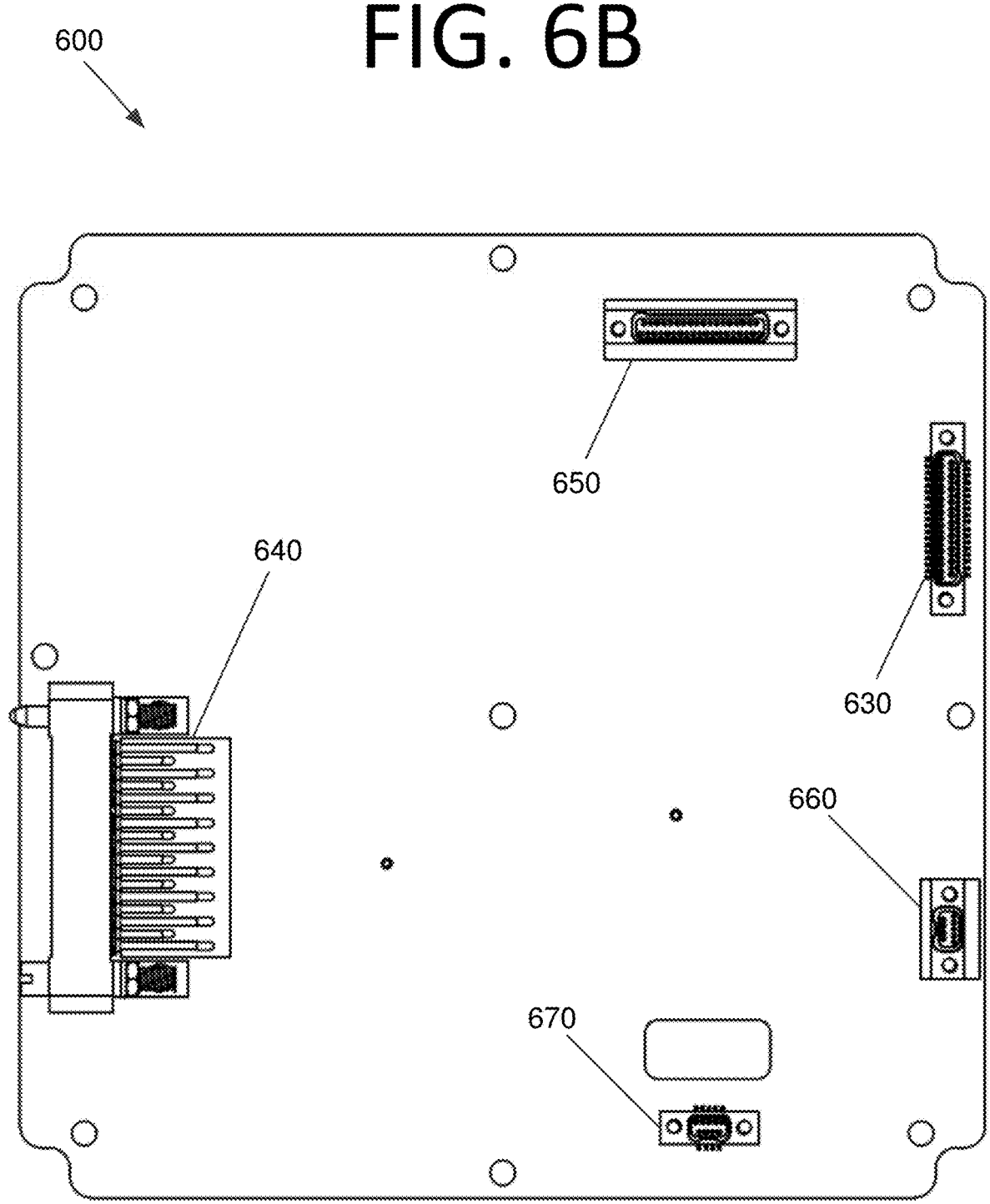

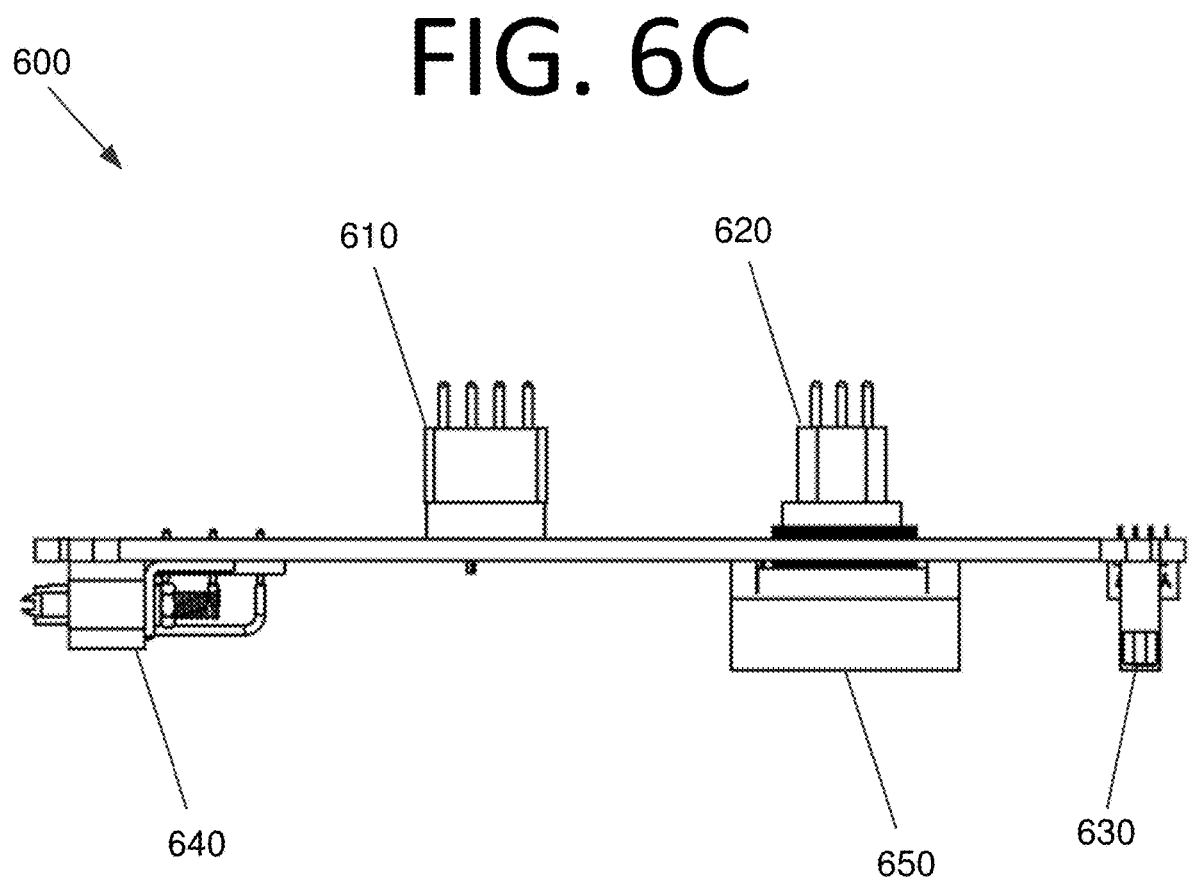

SPACE VEHICLE SYSTEM AND PAYLOAD INTERPOSER (PIP) BOARD

CROSS REFERENCE TO RELATED APPLICATION

This application is a continuation-in-part (CIP) of U.S. Nonprovisional patent application Ser. No. 15/872,630 filed Jan. 16, 2018, which is a continuation of U.S. Nonprovisional patent application Ser. No. 14/746,046 filed Jun. 22, 2015 (now issued as U.S. Pat. No. 9,878,805), which claims the benefit of U.S. Provisional Patent Application No. 62/016,566 filed Jun. 24, 2014. The subject matter of these earlier filed applications is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to space vehicle systems, and more particularly, to a space vehicle system and payload interposer (PIP) board that provides a standard interface for hosting payloads on a space vehicle platform.

BACKGROUND

Traditional multi-mission satellites consist of a satellite bus that provides basic satellite functionality, including power, communications, and attitude control, with a provision to host one or more payloads and the ability to command payloads from the ground. Traditional satellite busses cost tens to hundreds of millions of dollars and have detailed and complex payload and command interfaces, which substantially increase costs and development time. Moreover, the payload sections are typically volume, shape, and power-constrained, forcing the payload designer to design around the satellite bus, which can result in undesirable performance, higher costs, and increased risks.

In recent years, CubeSats have emerged as an alternative to traditional space solutions. CubeSats are relatively simple and can be developed with a more rapid turnaround. For space missions with smaller power and equipment capability requirements, CubeSats may offer the potential for an out-of-the-box solution where the same satellite can be used for different missions based on mission-specific software. CubeSats can typically be produced and purchased for a lower cost than conventional satellite systems, and have a higher availability for launch since they can be deployed by smaller, more widely available, less costly secondary payload launch options. Indeed, multiple CubeSats can be launched simultaneously in a "dispenser."

However, conventional CubeSats present a number of major design challenges for many missions, particularly for a multi-mission satellite bus. For instance, conventional CubeSats have very limited power and volume. Also, a design team still has to account for all normal effects of space operation (e.g., radiation, thermal management, launch envelope, etc.) without the benefit of traditional space components, and with little design margin in order to create a functional space vehicle. As a result, most conventional CubeSats have been plagued with issues of poor reliability, short lifetime, and poor performance. In fact, many conventional CubeSats fail to even turn on and make initial contact.

Extending CubeSats to provide a multi-mission bus capability has proven especially difficult. Previous attempts at producing multi-mission CubeSats have yielded satellites with relatively high costs, very little power and volume left for the payload section, and payload interfaces that are complex and/or limited in functionality. This leads to higher costs, longer development times, and poor reliability. Extending these designs to larger form factors is thus highly problematic. Accordingly, an improved convenient mechanism for space vehicle payload development, testing, and battery charging may be beneficial.

SUMMARY

Certain embodiments of the present invention may provide solutions to the problems and needs in the art that have not yet been fully identified, appreciated, or solved by conventional space vehicle payload interfaces. For example, some embodiments of the present invention pertain to a payload interposer (PIP) board, and a space vehicle system including the PIP board, that provides a standard interface for hosting payloads on a space vehicle platform.

In an embodiment, a space vehicle system includes a payload section. The payload section includes a PIP board that includes a host side payload interface connector and a payload side payload interface connector. The payload section also includes a payload operably connected to the PIP board via the payload side payload interface connector. The space vehicle system further includes a space vehicle that includes a PIP interface configured to interface with the host side payload interface connector. The payload section is configured to connect to the space vehicle. The PIP connector of the PIP board is configured to connect to the PIP interface of the space vehicle.

In another embodiment, a PIP board includes a host side payload interface connector configured to connect to a PIP interface of a space vehicle and a payload side payload interface connector configured to connect to a payload. The PIP board is configured to provide an interface between the space vehicle and the payload.

In yet another embodiment, a payload section includes a PIP board that includes a host side payload interface connector and a payload side payload interface connector. The payload section also includes a PIP plate that includes an opening through which the host side payload interface connector of the PIP board passes and interfaces with a space vehicle. The PIP plate facilitates connection between the space vehicle and the payload section. The payload section further includes a payload operably connected to the PIP board via the payload side payload interface connector.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 6B illustrates a bottom view of the PIP board of FIG. 6A, according to an embodiment of the present invention.

FIG. 6C illustrates a side view of the PIP board of FIG. 6A, according to an embodiment of the present invention.

DETAILED DESCRIPTION OF THE EMBODIMENTS

Figure 1:
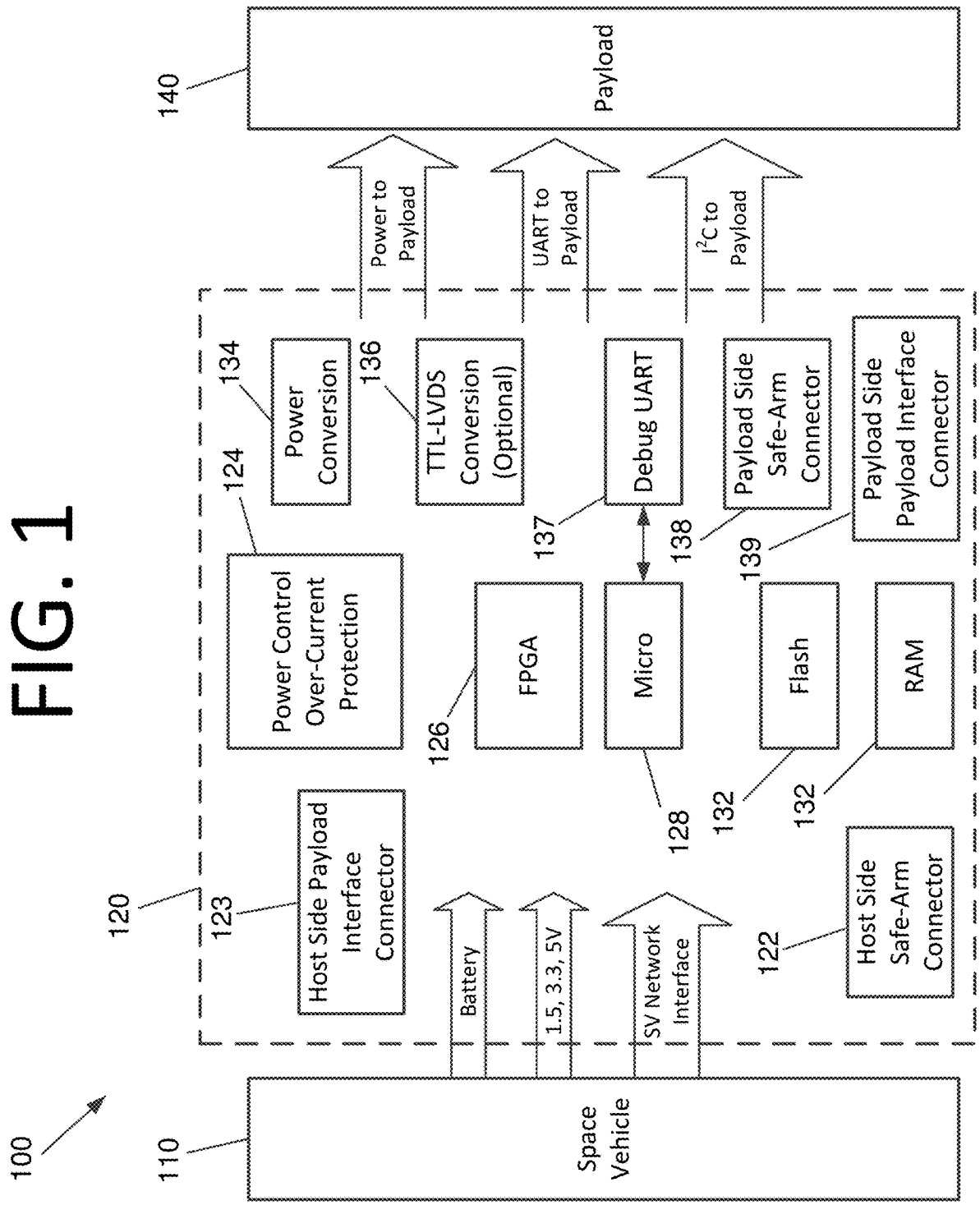
FIG. 1 is a functional diagram illustrating an integrated space vehicle and payload system, according to an embodiment of the present invention.

Some embodiments of the present invention pertain to a PIP board that provides an interface for hosting payloads on a space vehicle platform. Such embodiments may facilitate payload development in a manner that "abstracts" the hardware of the space vehicle from the payload developer. In other words, communications, power systems, attitude determination and control systems (ADCS), command and data handler (CDH), etc. may all be provided in a "stock" space vehicle that the payload developer may not even need to obtain when developing the payload. Rather, the PIP board may be used to ensure that the payload will properly communicate with the space vehicle once development is completed.

The payload in such embodiments mates with the space vehicle (e.g., a CubeSat or any other suitable space vehicle without deviating from the scope of the invention) by use of a payload-specific interposer section. The interposer section physically connects the payload to the space vehicle, provides electrical connections for power and signaling, and provides a microcontroller to implement payload-specific commands and data transfers in some embodiments. The interposer section contains a small circuit board (i.e., the PIP board) containing the circuitry needed to provide power to, command, and control the payload. The PIP board is integrated into the internal network of the space vehicle in some embodiments, which provides a significant amount of functionality for commanding, data uplink, data downlink, and on-orbit re-programmability, per the above.

In order for the space vehicle to be able to interface with the PIP board and the payload, the space vehicle CDH may be extended to support payload operations. The CDH may control power to the PIP board and initiate operations based on the space vehicle's position in its orbit, for instance. However, any suitable interfacing mechanism may be used without deviating from the scope of the invention.

Per the above, the most direct and fastest way to build a payload for the space vehicle is to use standard PIP functionality that interfaces with space vehicle systems. Building a payload in this manner allows for rapid integration of the payload with the space vehicle. It also eliminates the need for detailed internal technical knowledge of the space vehicle or PIP board.

The next level of complexity is to customize the PIP board software to provide a new capability that is not currently provided. This requires greater expertise on the part of the payload provider, as well as access to the software or a software developer's kit (SDK). Finally, the developer could create a fully custom PIP board and software solution to support specific payload requirements. This allows complex interface needs or a different concept of operations to be supported that are not provided by the standard PIP board and software. This comes at a relatively high cost though since this approach requires greater expertise in hardware and software design on the part of the payload provider. It also likely requires support or engineering assistance from the space vehicle design team.

In some embodiments, the space vehicle itself may only occupy a portion of the volume available in a normal 3U Cube Sat launcher (e.g., 1.5U of 3U). The reminder of the space in the launcher may thus be used for PIP board and payload functionality. In some embodiments, the mass of the PIP board and payload may be limited to meet launch provider constraints (e.g., 2.5 kg or less). The ADCS of the space vehicle may be designed to accommodate for the weight and/or shape of the payload and PIP board.

FIG. 1 is a functional diagram illustrating an integrated space vehicle and payload system 100, according to an embodiment of the present invention. Integrated space vehicle and payload system 100 may be non-flight-ready or flight-ready without deviating from the scope of the invention. A space vehicle 110 provides +1.5V, +3.3V, and +5V power, bulk payload power from batteries, and a network interface to a PIP board 120. PIP board 120, in turn, provides power, a universal asynchronous receiver-transmitter (UART) interface, and an I²C interface to payload 140.

PIP board 120 uses a field programmable gate array (FPGA) 126 (e.g., an Actel™ FPGA) to allow routing of different signals between a microcontroller 128 (e.g., model STM32F417 by STMicroelectronics™), the on-board components, and connectors 122, 123, 138, 139. Host side payload interface connector 123 provides communications for payload 140 from space vehicle 110 to PIP board 120. Payload side payload interface connector 139 routes power, UART, and I²C to payload 140 in this embodiment. FPGA 126 implements the circuit routing, system watchdogs, and other functionality required in the space vehicle architecture in this embodiment. Power to payload 140 is controlled by a Payload_PowerEnable line, as well as by FPGA 126 in this embodiment. Thus, FPGA 126 allows software of PIP board 120 to control power to payload 140. An over-current protection circuit 124 protects PIP board 120 from damage due to current surges, and is controlled by code of FPGA 126.

Microcontroller 128 may be used to direct communications between space vehicle 110 and payload 140. Microcontroller 128 may also be used to control payload 140, format messages to and/or from payload 140, extract data for downlink and other payload-specific functions, etc. Microcontroller 128 may include a relatively large number of unused interfaces (e.g., one or more UART, serial peripheral interface (SPI), and I²C interfaces) that may be made available to payload 140. Microcontroller 128 also includes software that controls power to payload 140 separate from PIP board 120 itself. In other words, microcontroller 128 can operate for system maintenance (e.g., file transfer, reprogramming, etc.) without the additional power draw of payload 140. Flash 130 may provide a file system for persistent storage, and random access memory (RAM) 132 may provide temporary storage.

Space vehicle 110 should be made safe for transport and to satisfy launch provider requirements. "Safing" space vehicle 110 typically requires disabling the onboard power supply (e.g., batteries). An externally accessible payload side safe-arm connector 138 provides safe-arm functionality. Space vehicle 110 should be "armed" before launch by inserting a safe-arm plug (not shown), for example. Space vehicle 110 and attached payload 140 may be powered down and inoperable until the safe-arm plug is installed. Debug UART 137 is used for development and testing of the software of microcontroller 128 and appears on externally accessible payload side safe-arm connector 138 so that it can be accessed while space vehicle 110, PIP board 120, and payload 140 are mated in flight configuration.

Power conversion circuitry 134 converts power to a form usable by payload 140. Power to payload 140 is provided in a single supply line adjustable between 3.0 volts and 9.0 volts in some embodiments. PIP board 120 switches on power to payload 140 when payload operation is required and may subsequently power down payload 140 to maximize battery life. Low voltage transistor-transistor logic (TTL) signaling from space vehicle 110 may be converted to a low voltage differential signaling (LVDS) by TTL-LVDS conversion circuitry 136, if required by payload 140. In this embodiment, there are two available interfaces—a UART interface and an I²C interface—that are provided to payload 140. These signals may be routed through FPGA 126, which allows flexibility in pin assignments between microcontroller 128 and host side payload interface connector 139. Reprogramming FPGA 126 may allow otherwise unused interfaces of microcontroller 128 to be routed to payload 140 via payload side payload interface connector 139 of PIP board 120. PIP board 120 can then support various embodiments of payload 140 with varying or unique interfacing requirements.

Figure 2:
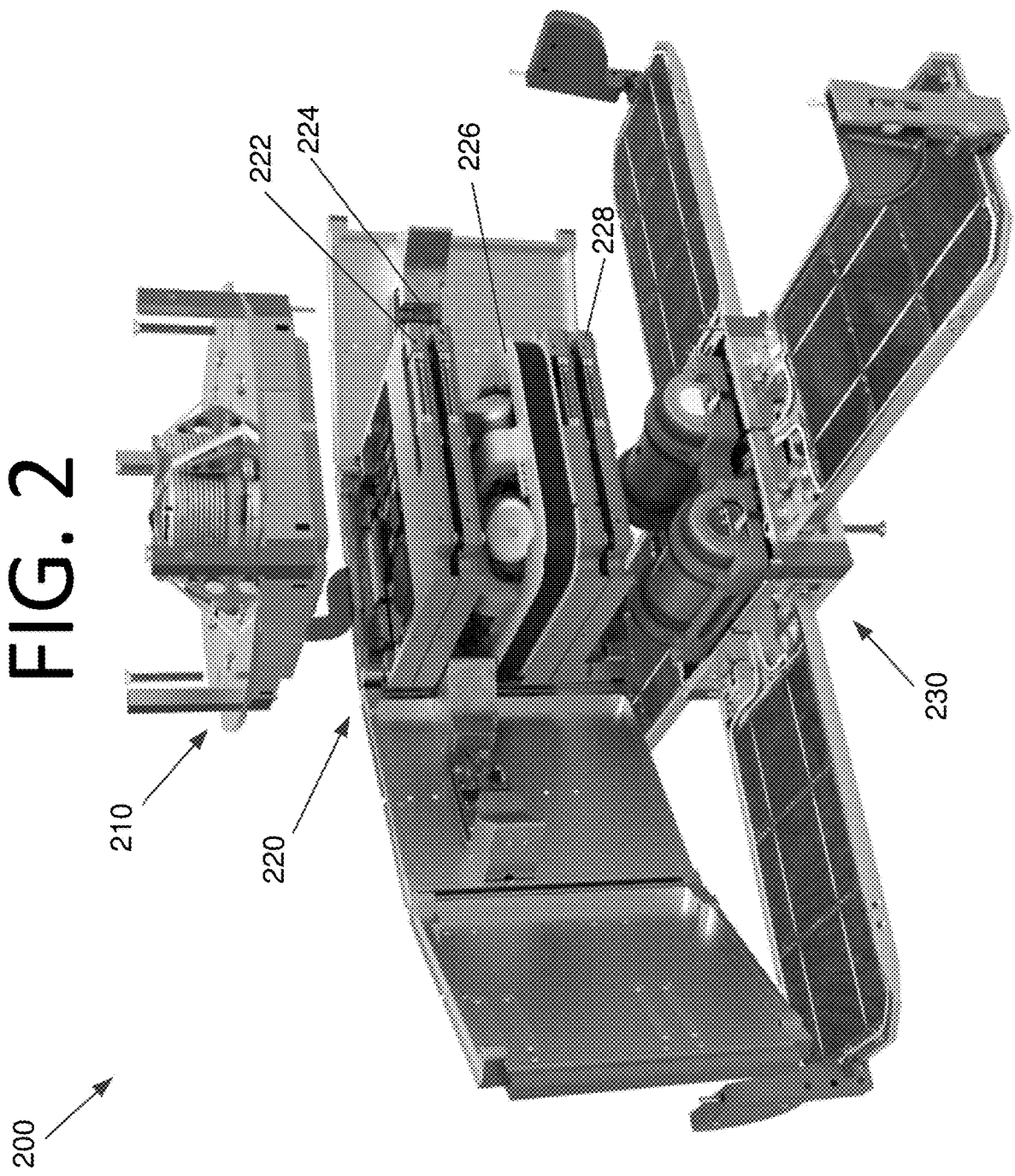
FIG. 2 is an exploded perspective view illustrating a CubeSat with an opened chassis, according to an embodiment of the present invention.

FIG. 2 is an exploded perspective view illustrating a CubeSat 200 with an opened chassis, according to an embodiment of the present invention. The bottom of CubeSat 200 (not visible in this view) may be configured to connect to, and interface with, a payload section and a PIP board. See, e.g., FIGS. 3 and 4. CubeSat 200 includes a top section 210 including radio frequency (RF) components, a middle section 220 including circuitry, and a bottom section 230 including power components (e.g., batteries, solar panels, power circuitry, etc.). Middle section 220 includes a high band digital radio 222, a low band digital radio 224, an ADCS 226, and a CDH 228.

Figure 3:
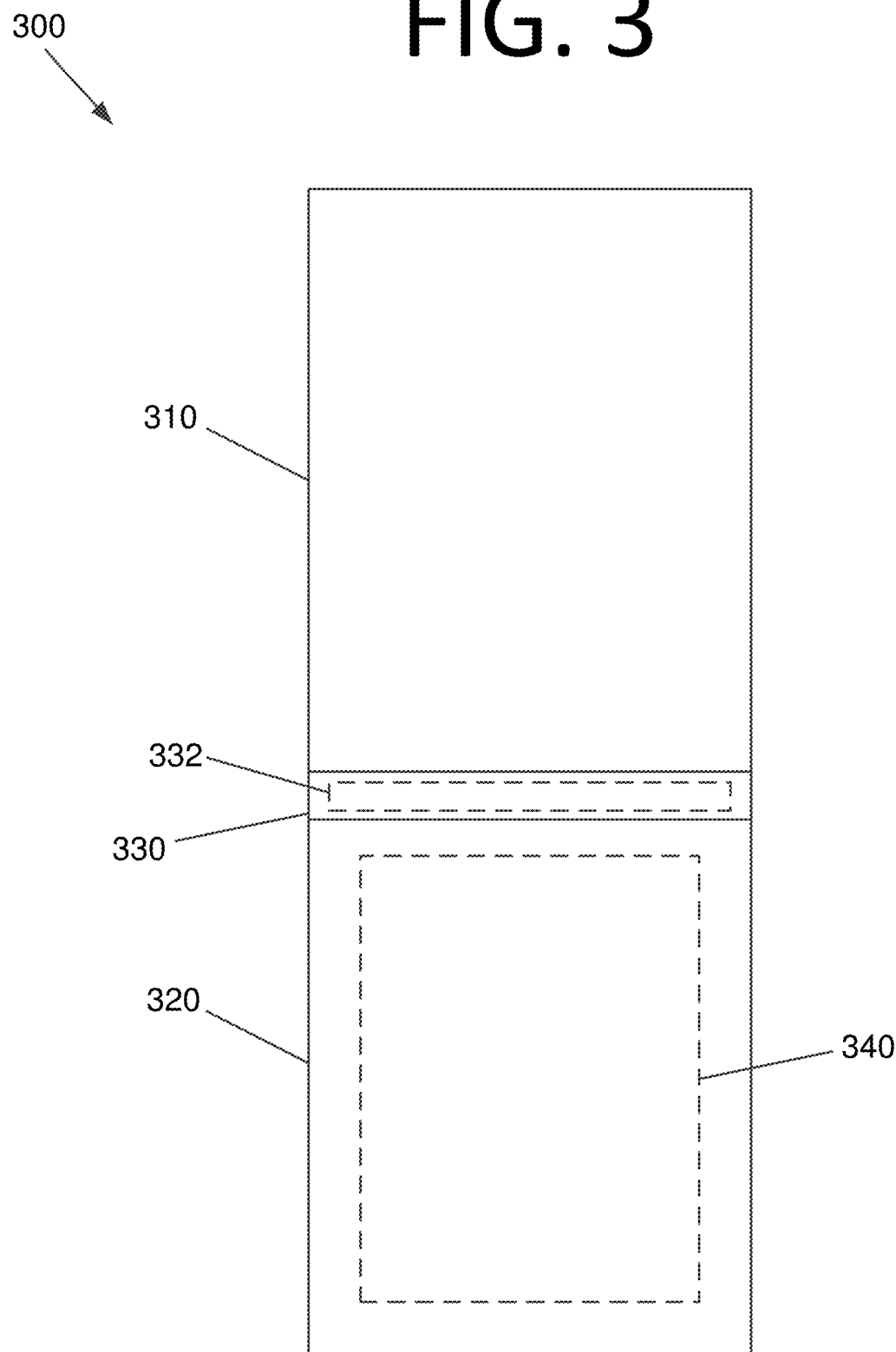
FIG. 3 is a side view illustrating a space vehicle system, according to an embodiment of the present invention.

FIG. 3 is a side view illustrating a space vehicle system 300, according to an embodiment of the present invention. It should be noted that while shown as generic rectangles, the components of space vehicle system 300 may have any desired shape, size, and/or configuration without deviating from the scope of the invention. A space vehicle 310 is operably connected to a separable payload section 320. In some embodiments, space vehicle 310 may be space vehicle 110 of FIG. 1. A PIP plate 330 at one end of payload section 320 operably connects to space vehicle 310, allowing pins (not shown) of PIP board 332 to be connected to respective connectors (not shown) of space vehicle 310. PIP plate 330 may be attached to space vehicle 310 in some embodiments via screws, rivets, fasteners, or any other suitable connection mechanism without deviating from the scope of the invention. A payload 340 is housed within payload section 320 and interfaces with space vehicle 310 via PIP board 332. Electrical connections between space vehicle 310 and payload 340 are provided via PIP board 332.

Figure 4:
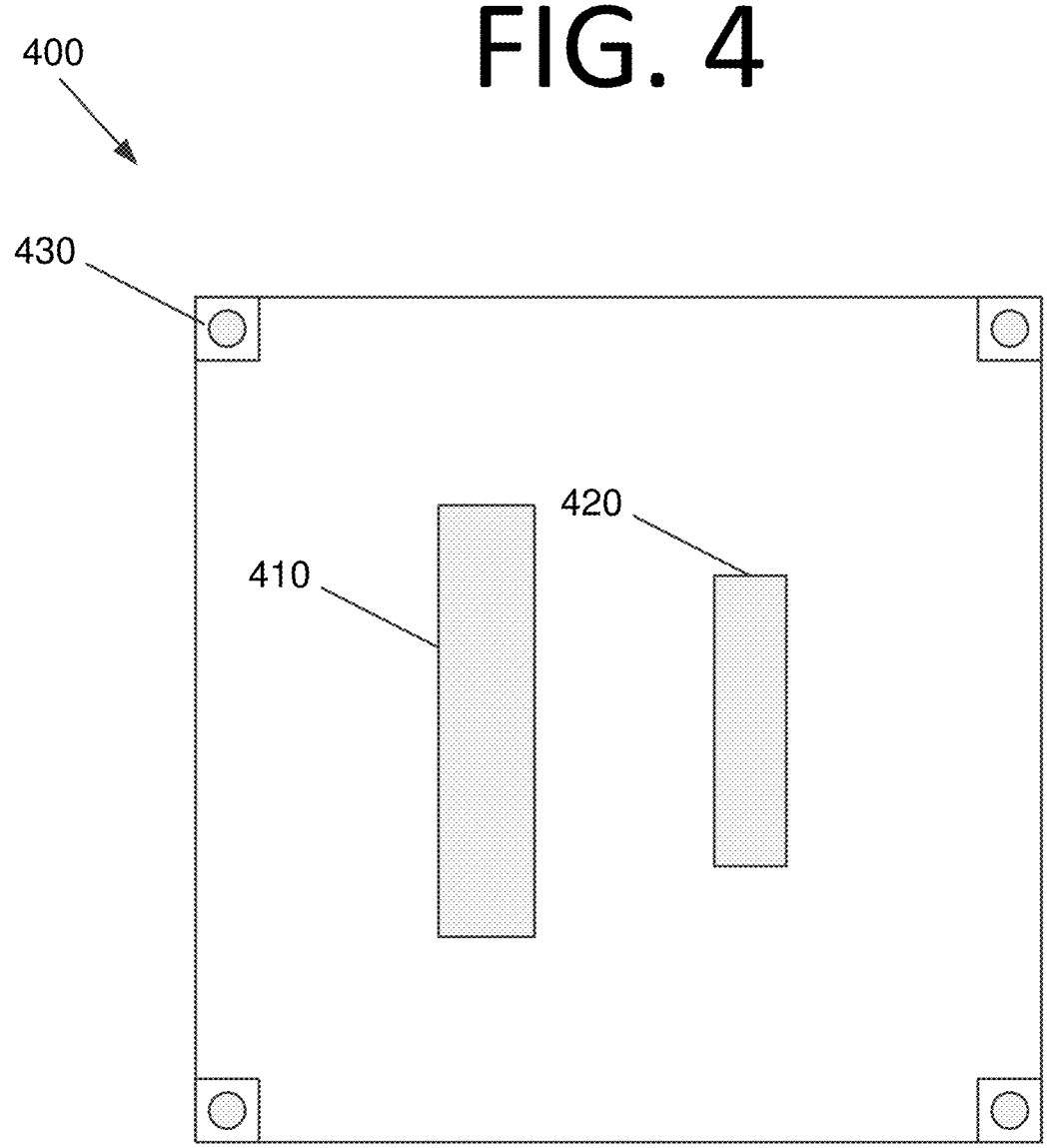
FIG. 4 is a bottom view illustrating a space vehicle, according to an embodiment of the present invention.

FIG. 4 is a bottom view illustrating a space vehicle 400, according to an embodiment of the present invention. Space vehicle 400 is configured to interface with pins from a PIP board of a payload section. More specifically, a PIP interface 410 that is configured to connect with a host side payload interface connector of the PIP board and a safe-arm interface 420 configured to connect with a host side safe-arm connector of the PIP board are included. In this embodiment, four screw holes 430 allow connection of a payload section to space vehicle 400 via screws.

Figure 5A:
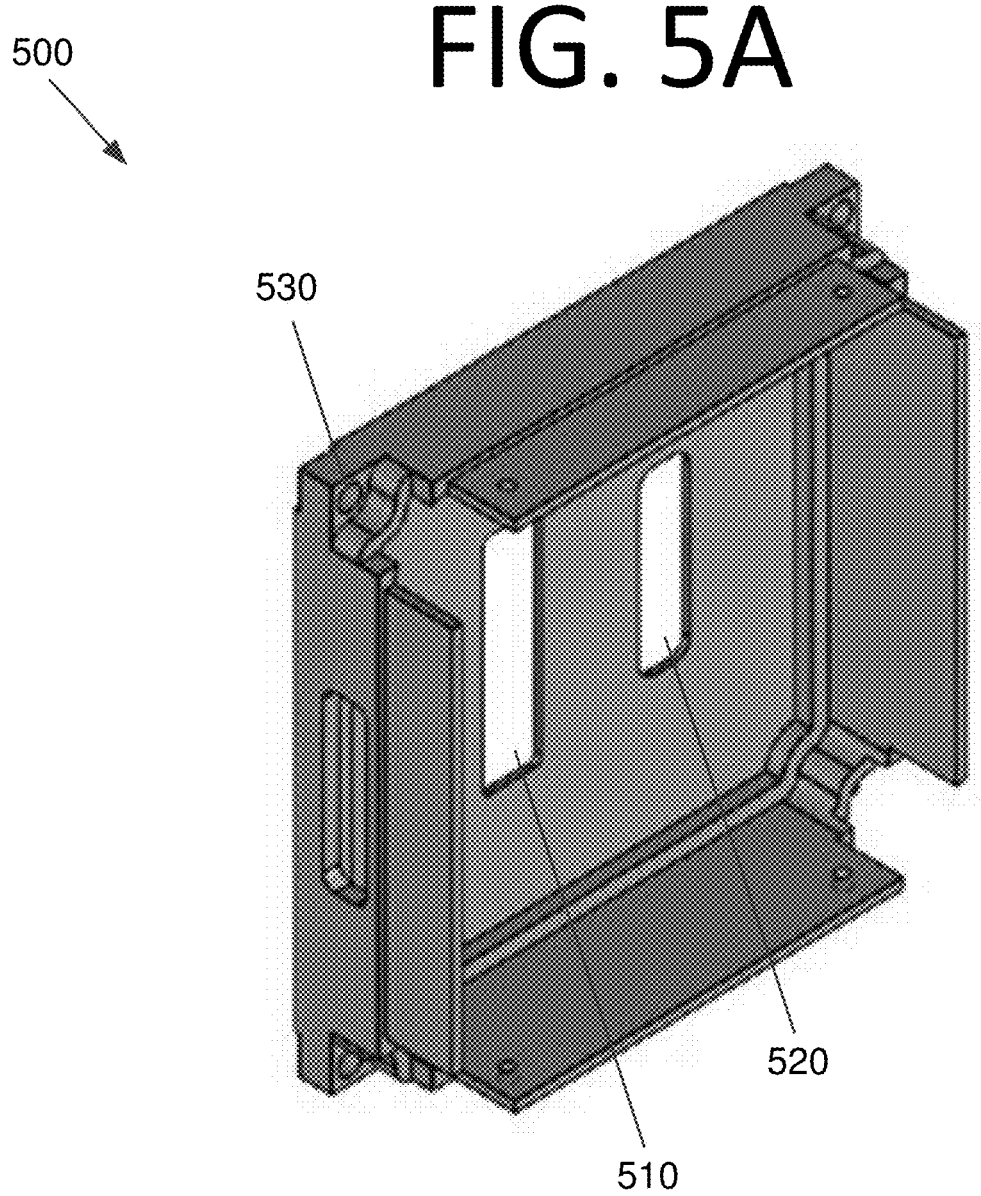
FIG. 5A is a perspective view illustrating a PIP plate, according to an embodiment of the present invention.
Figure 5B:
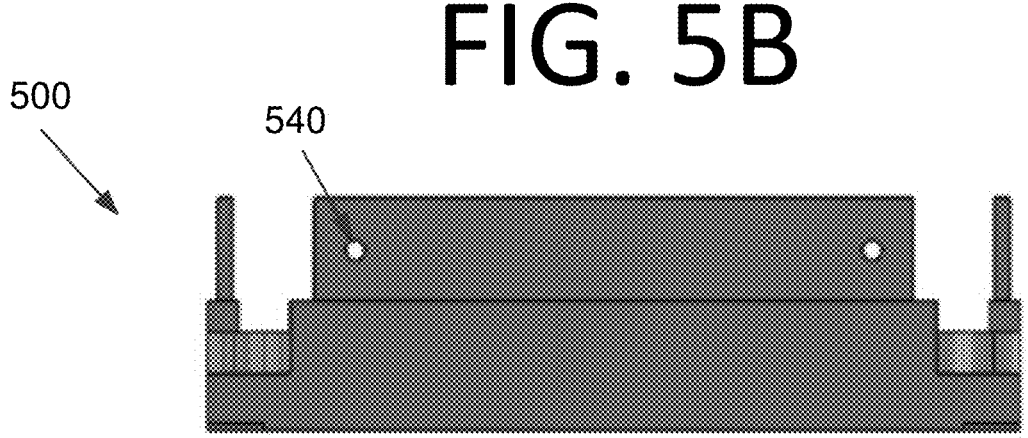
FIG. 5B is a side view illustrating the PIP plate of FIG. 5A, according to an embodiment of the present invention.

FIGS. 5A and 5B are perspective and side views, respectively, illustrating a PIP plate 500, according to an embodiment of the present invention. PIP plate 500 includes openings 510, 520 through which host side payload interface connector pins and host side safe-arm pins can pass, respectively. Screw holes 530 allow PIP plate 500 to be connected to a space vehicle. Payload section screw holes 540 allow PIP plate to be connected to a payload section as a part thereof.

Figure 6A:
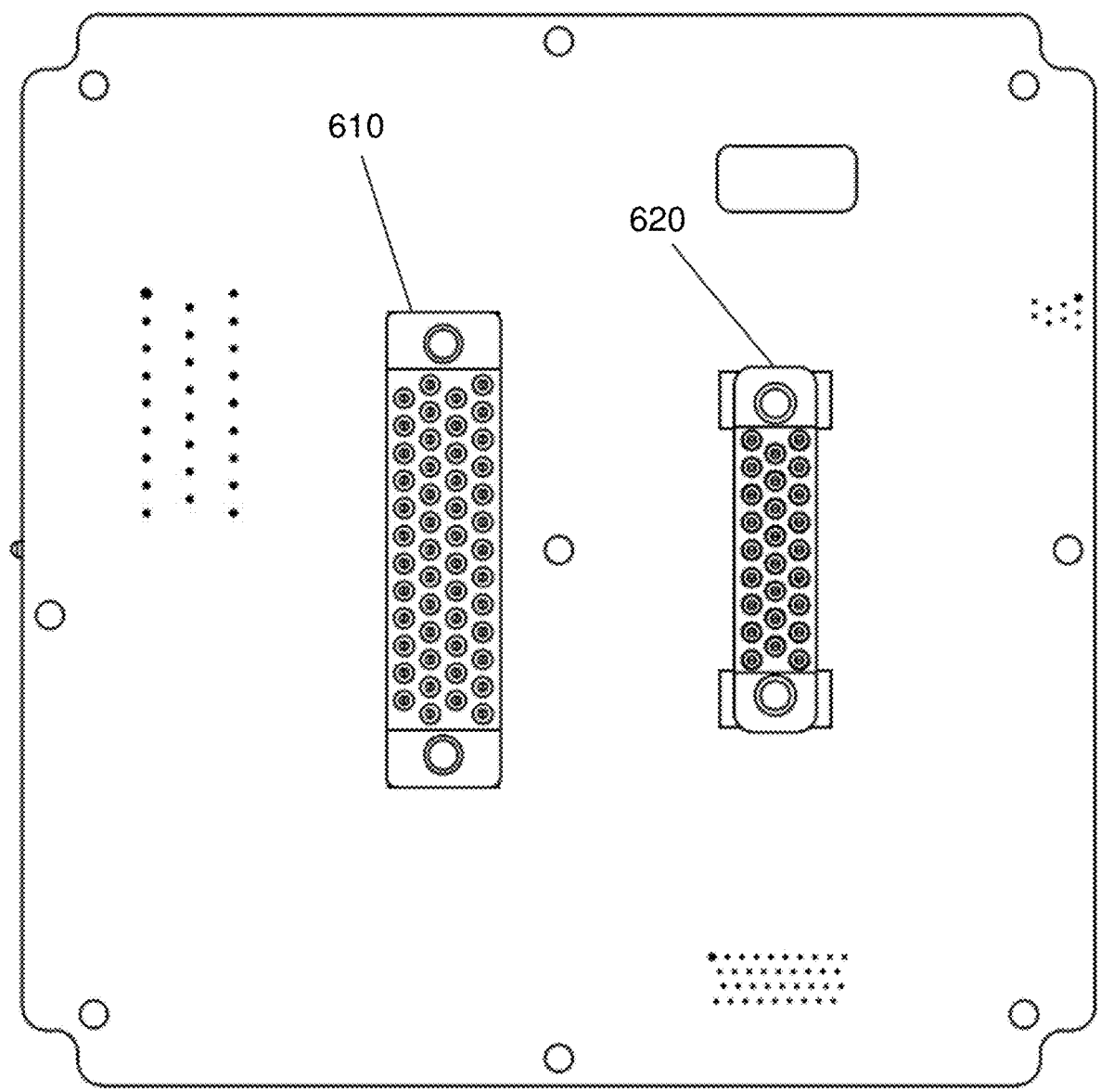
FIG. 6A illustrates a top view of a PIP board, according to an embodiment of the present invention.

FIGS. 6A-C illustrate top, bottom, and side views, respectively, of a PIP board 600, according to an embodiment of the present invention. PIP board 600 includes a host side payload interface connector 610 and a host side safe-arm connector 620 extending from its top in this embodiment that interface with respective connectors of a space vehicle. Host side payload interface connector 610 facilitates communications between the space vehicle and PIP board 600. Host side safe-arm connector 620 exposes the space vehicle safe-arm interface when PIP board 600 is attached. PIP board 600 also includes a payload side payload interface connector 630 and a payload side safe-arm connector 640 extending from its bottom in this embodiment that interfaces with a payload. Payload side payload interface connector 630 interfaces between PIP board 600 and the payload. Payload side safe-arm connector provides external access to the safe-arm functionality of the payload. PIP board 600 further includes a star tracker connector 650, a sun vector sensor connector (from host) 660, and a sun vector sensor connector (to payload) 670. Connectors 650, 660, 670 provide star tracker and sun vector sensor information to PIP board 600 for use by the space vehicle. It should be noted that connectors 650, 660, 670 are not present in some embodiments, and may be generally unrelated to PIP board functionality.

Collectively, host side payload interface connector 610 and host side safe-arm connector 620 may be considered to be the space vehicle interface. Host side payload interface connector 630 is the interface between PIP board 600 and the payload. In this embodiment, host side safe-arm connector 620 serves as a relocation of space vehicle safe-arm functionality to be accessible when the space vehicle/PIP/payload are fully assembled.

The PIP board of some embodiments adapts the network of the space vehicle to the payload, and may provide an endpoint in the space vehicle network for attaching the payload. In this sense, the PIP board may be somewhat payload-specific in some embodiments. A UART interface, an I²C interface, or both may provide a standard payload interface that is highly configurable to adapt to preexisting payloads, and a large number of unused interfaces on the PIP board microcontroller may be made available to the payload. For many payloads, this is sufficient. Such a design is shown in FIG. 1, for instance.

Figure 7:
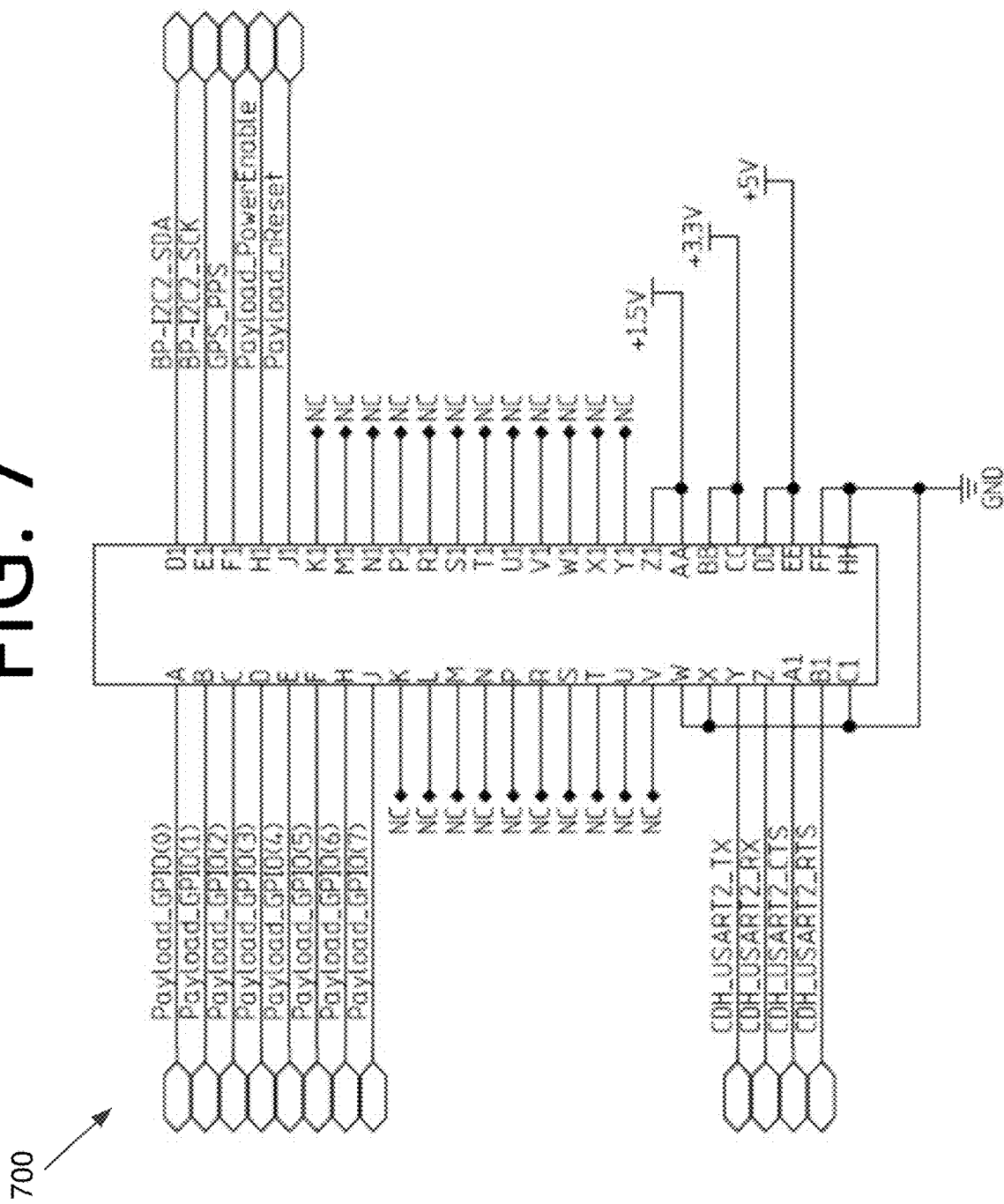
FIG. 7 is an architectural diagram illustrating pins of a host side payload interface connector, according to an embodiment of the present invention.

FIG. 7 is an architectural diagram illustrating pins of a host side payload interface connector 700, according to an embodiment of the present invention. In some embodiments, host side payload interface connector 700 may be host side payload interface connector 610 of FIGS. 6A-C. A table of the pins shown in FIG. 7 is included below.

TABLE 1

HOST SIDE PAYLOAD INTERFACE CONNECTOR PIN DESCRIPTIONS

| Pin: | Name: | Usage: |
| --- | --- | --- |
| A | CDH_DCMI_Data(0) | General purpose I/O pin (reserved) |
| B | CDH_DCMI_Data(1) | General purpose I/O pin (reserved) |
| C | CDH_DCMI_Data(2) | General purpose I/O pin (reserved) |
| D | CDH_DCMI_Data(3) | General purpose I/O pin (reserved) |
| E | CDH_DCMI_Data(4) | General purpose I/O pin (reserved) |
| F | CDH_DCMI_Data(5) | General purpose I/O pin (reserved) |
| H | CDH_DCMI_Data(6) | General purpose I/O pin (reserved) |
| J | CDH_DCMI_Data(7) | General purpose I/O pin (reserved) |
| Y | CDH_USART2_TX | CDH Serial UART transmit data (used for network) |
| Z | CDH_USART2_RX | CDH Serial UART receive data (used for network) |
| A1 | CDH_USART2_CTS | CDH Serial UART CTS pin (used for network) |
| B1 | CDH_USART2_RTS | CDH Serial RTS pin (used for network) |
| D1 | BP-I2C2_SDA | CDH I²C interface data signal (reserved) |
| E1 | BP-I2C2_SCK | CDH I²C interface clock signal (reserved) |
| F1 | GPS_PPS | 1PPS event output from onboard space vehicle GPS |
| H1 | Payload_PowerEnable | Active-high signal driven by CDH to enable power to payload and PIP board (see FIG. 8) |
| J1 | Payload_nRST | Active-low signal to reset the PIP board FPGA and microcontroller (set to 0 to reset; set to 1 to release the payload from reset) |
| W, X, C1, FF, HH | GND | Ground |
| Z1, AA | +1.5 V | Power to PIP board and payload (see FIG. 8) |
| BB, CC | +3.3 V | Power to PIP board and payload (see FIG. 8) |
| DD, EE | +5 V | Power to PIP board and payload (see FIG. 8) |
| K, L, M, N, P, R, S, T, U, V, K1, M1, N1, P1, R1, S1, T1, U1, V1, W1, X1, Y1, Z1 | NC | Not connected |

The NC pins are used in this embodiment for non-payload-related functions of the space vehicle. As such, they are not relevant to the payload/PIP board interface in this embodiment.

Figure 10:
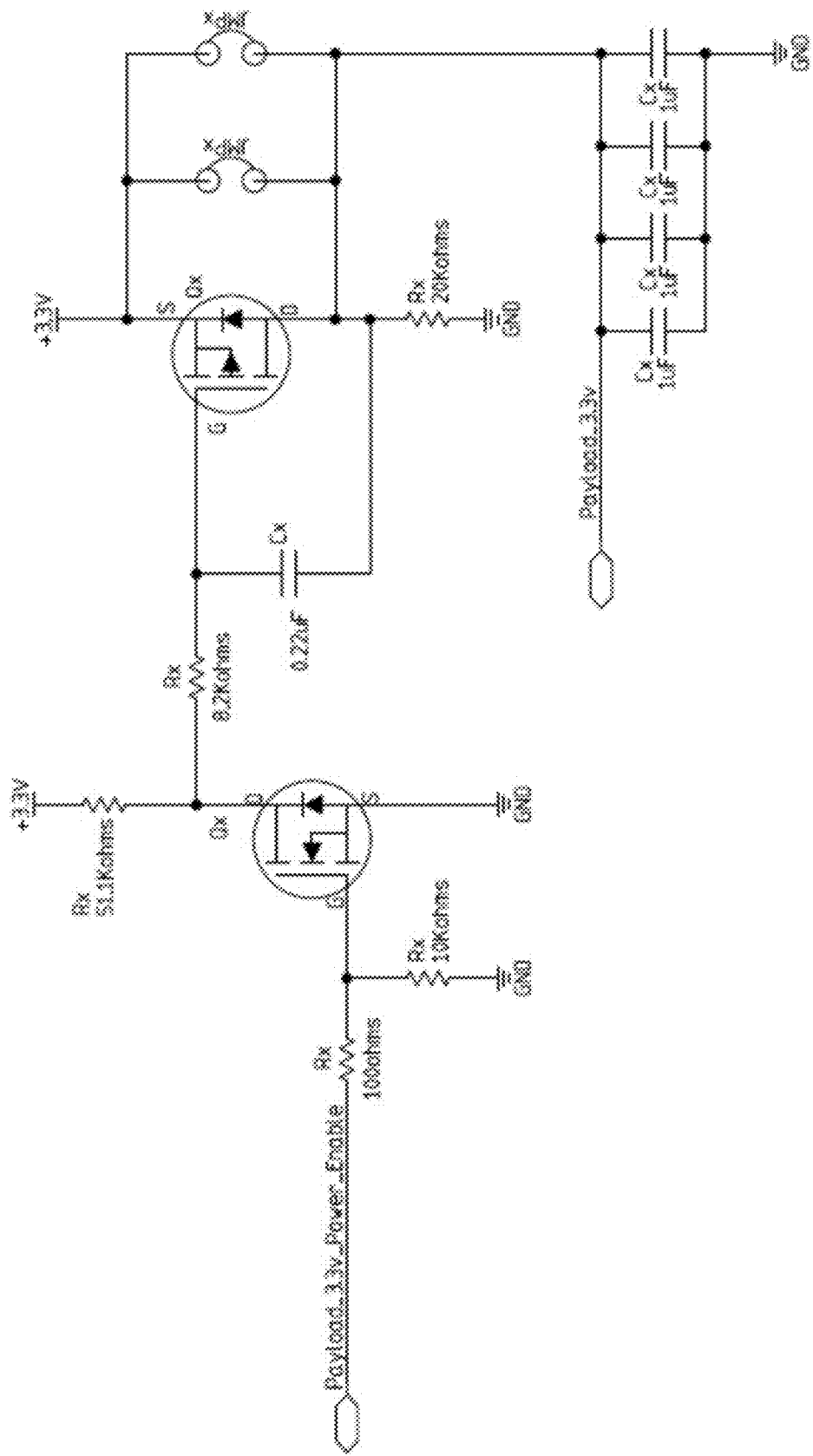
FIG. 10 is a circuit diagram illustrating a 3.3V power supply, according to an embodiment of the present invention.

In order to protect the health of the overall space vehicle, the space vehicle can control the power to the payload via the Payload_PowerEnable line (pin H1). See FIG. 10 an example circuit 1000 that implements this functionality. Responsive to power not being provided to pin H1, the PIP board disables all power to itself and the payload. This functionality should be implemented by a separate circuit for each voltage used by the payload. In addition, the software of the PIP board microcontroller should provide a mechanism for providing power to the payload separately from the PIP board itself. This allows operation of the PIP board microcontroller for system maintenance (e.g., file transfer, reprogramming, etc.) without the additional power draw of the payload itself.

The Payload_nRST line (pin J1) may be used by software of the space vehicle CDH to reset the FPGA and microcontroller of the PIP board. The PIP board microcontroller will power-off the payload after reset.

There are eight payload general purpose digital input/output (I/O) pins available in this embodiment for use by the PIP board and the space vehicle (i.e., pins A, B, C, D, E, F, H, and J). Usage of these pins may be defined by FPGA programming and CDH software. These pins are reserved for future use in Table 1, but may be used for I/O operations as desired for a given mission.

The 1PPS output from the space vehicle GPS is available on pin F1 of connector 700. Generally, the FPGA of the PIP board may be used to route the signal to the payload for its use.

The UART interface (i.e., pins Y, Z, A1, and B1) may be used for the network between the PIP board microcontroller and the space vehicle. An additional UART, which may be connected directly to the PIP board microcontroller (see FIG. 1), should be provided for debugging. The PIP board may provide the debug UART on the safe-arm connector.

In some embodiments, both the PIP board microcontroller and FPGA are programmed via JTAG interfaces. Connectors for this use should be provided on the PIP board in such embodiments.

Figure 8:
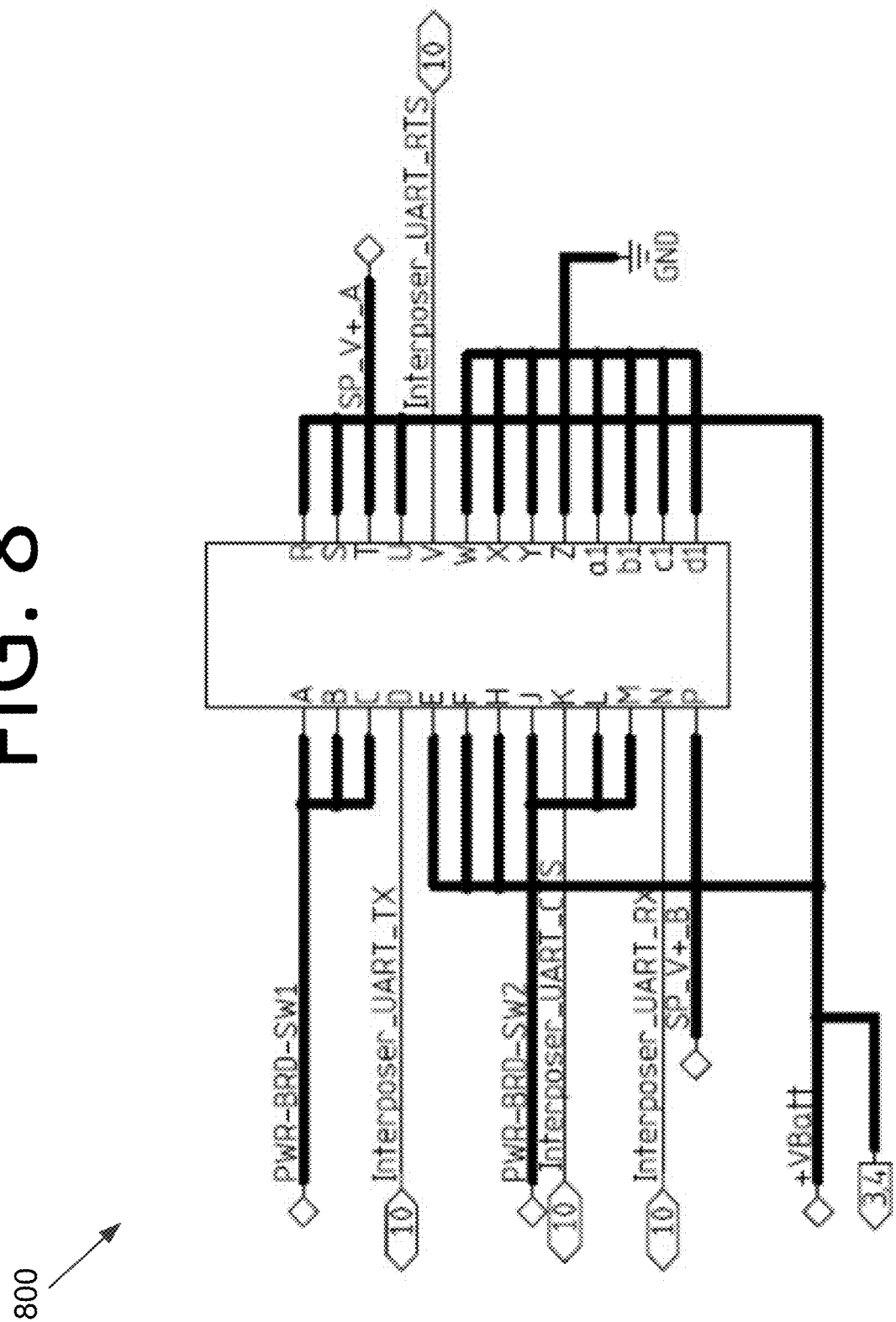
FIG. 8 is an architectural diagram illustrating pins for a payload side battery/safe-arm connector, according to an embodiment of the present invention.

The PIP board of some embodiments provides an externally accessible payload side safe-arm connector for safe-arm functionality and to expose the debug UART of the PIP board microcontroller. FIG. 8 is an architectural diagram illustrating pins for a payload side battery/safe-arm connector 800, according to an embodiment of the present invention. In some embodiments, payload side battery/safe-arm connector 800 may be payload side safe-arm connector 640 of FIGS. 6A-C. In some embodiments, debug UART is available on payload side safe-arm connector 640, but not on host side safe-arm connector 620.

TABLE 2

PAYLOAD SIDE SAFE-ARM (WITH UART) CONNECTOR PIN DESCRIPTIONS

| Pin: | Name: | Usage: |
| --- | --- | --- |
| A, B, C | Power_Switch1 | Power |
| D | UART_TX | Interposer microcontroller UART |
| E, F, H, R, S, U | BATT | Battery |
| J, L, M | Power_Switch2 | Power |
| K | UART_CTS | Interposer microcontroller UART |
| N | UART_RX | Interposer microcontroller UART |
| P | SP_V+_B | Reserved |
| T | SP_V+_B | Reserved |
| V | UART_RTS | Interposer microcontroller UART |
| W, X, Y, Z, a1, b1, c1, d1 | GND | Ground |

In some embodiments, arming the space vehicle is performed by shorting all battery pins to all switch pins (Power_Switch1 and Power_Switch2).

Payload Side Payload Interface Connector

Figure 9:
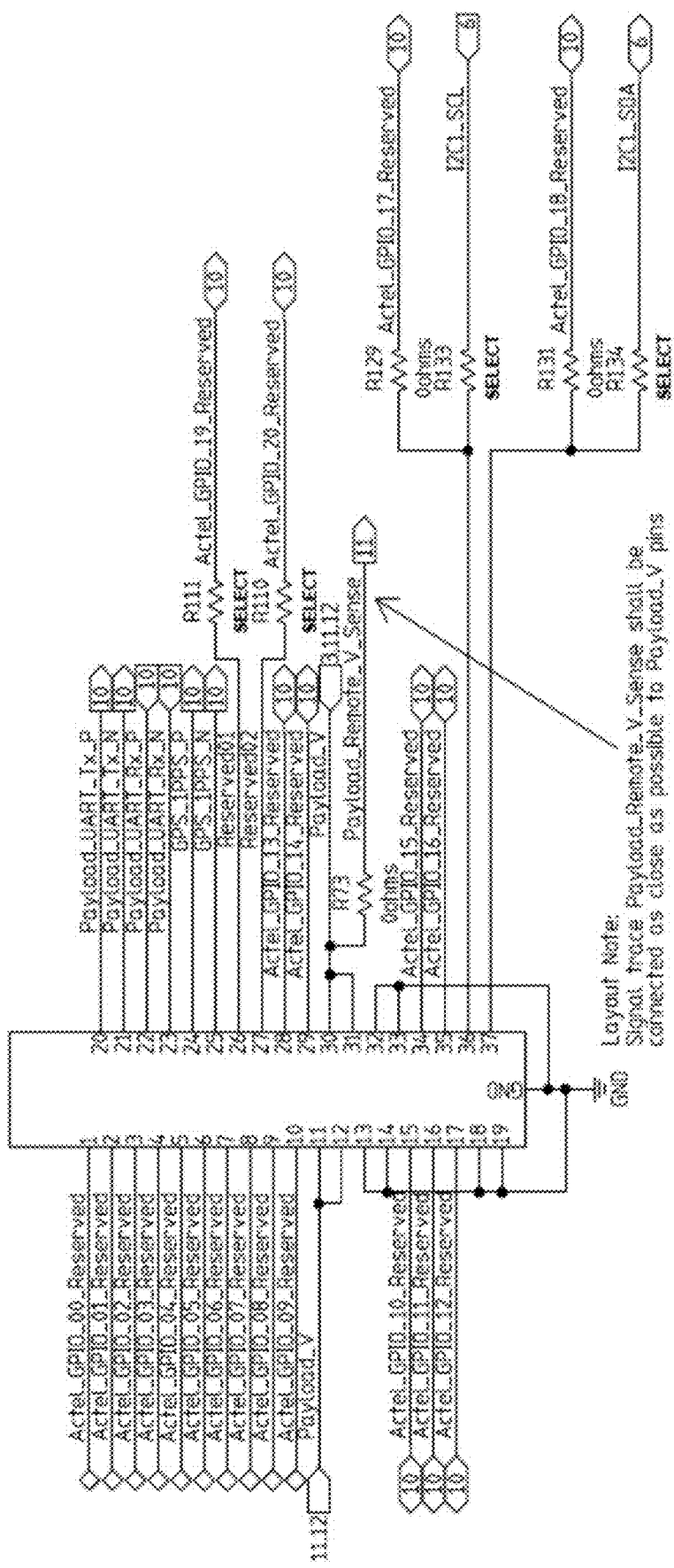
FIG. 9 is an architectural diagram illustrating pins for a payload side payload interface connector, according to an embodiment of the present invention.

FIG. 9 is an architectural diagram illustrating pins of a payload side payload interface connector 900, according to an embodiment of the present invention. In some embodiments, payload side payload interface connector 900 may be payload side payload interface connector 630 of FIGS. 6A-C. While connections labeled "ACTEL_GPIO" are for an Actel™ FPGA in this embodiment, any suitable FPGA may be used without deviating from the scope of the invention.

Figure 11:
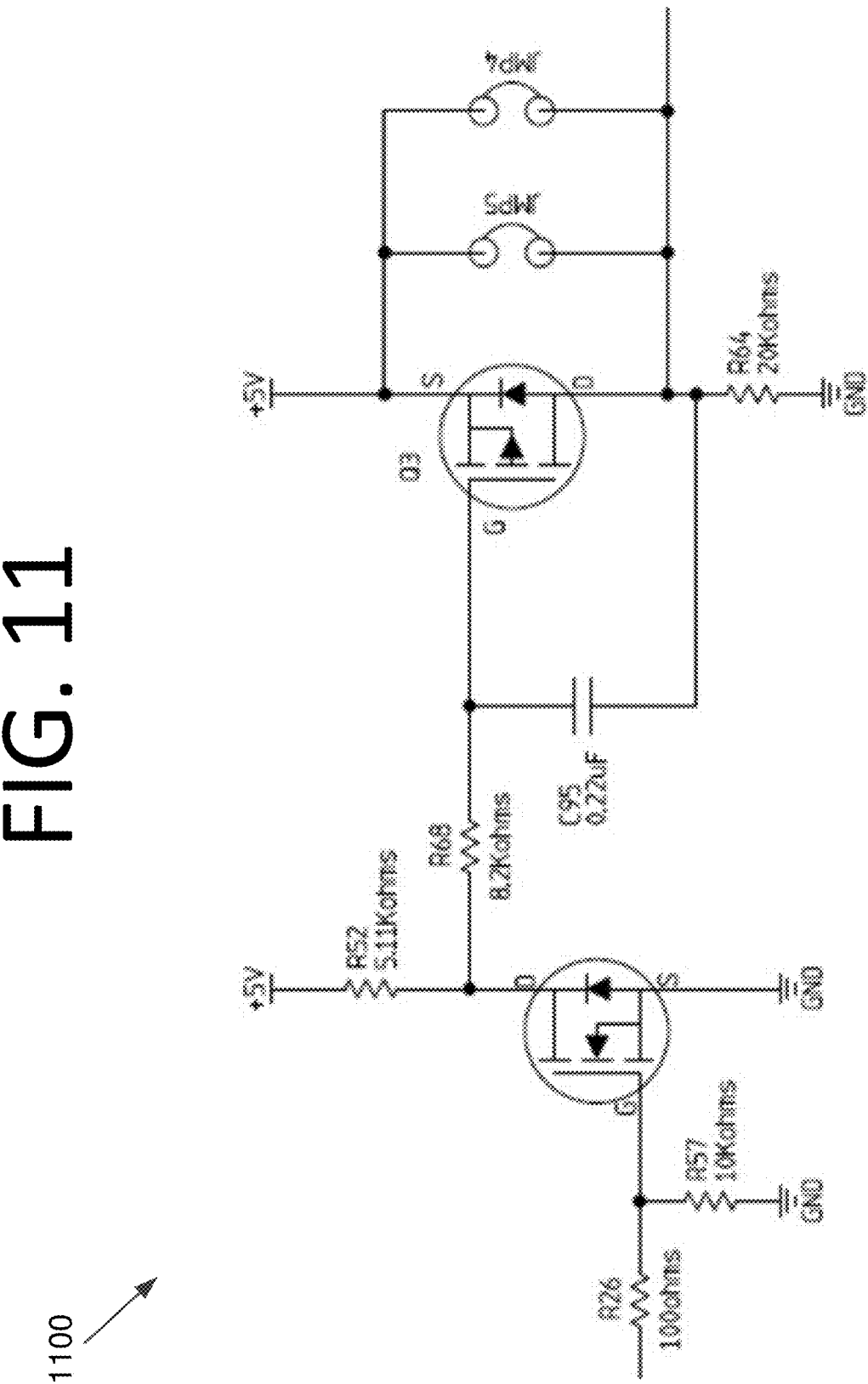
FIG. 11 is a circuit diagram illustrating a 5V power supply, according to an embodiment of the present invention.

In some embodiments, the payload is powered by a single power supply, which is enabled or disabled under the control of the PIP board microcontroller. For examples of 3.3V and 5V power control circuits, see circuits 1000, 1100 of FIGS. 10 and 11, respectively. The voltage of this supply may be selectable via resistor options on the PIP board from 3.0V to 9.0V in some embodiments. All of the pins labeled "Payload Power" in Table 3 below are connected to this supply, which pertains to a male 37-pin Omnetics™ connector (part number MNPO-37-VV-S-ETH (A28200-037)).

TABLE 3

PAYLOAD SIDE PAYLOAD INTERFACE CONNECTOR PIN DESCRIPTIONS

| Pin: | Name: | Usage: |
|---|---|---|
| 1 | N/A | Connect to FPGA GPIO (reserved) |
| 2 | N/A | Connect to FPGA GPIO (reserved) |
| 3 | N/A | Connect to FPGA GPIO (reserved) |
| 4 | N/A | Connect to FPGA GPIO (reserved) |
| 5 | N/A | Connect to FPGA GPIO (reserved) |
| 6 | N/A | Connect to FPGA GPIO (reserved) |
| 7 | N/A | Connect to FPGA GPIO (reserved) |
| 8 | N/A | Connect to FPGA GPIO (reserved) |
| 9 | N/A | Connect to FPGA GPIO (reserved) |
| 10 | N/A | Connect to FPGA GPIO (reserved) |
| 11 | Payload Power | Voltage determined by resistor option on PIP board |
| 12 | Payload Power | Voltage determined by resistor option on PIP board |
| 13 | GND | Ground |
| 14 | GND | Ground |
| 15 | N/A | Connect to FPGA GPIO (reserved) |
| 16 | N/A | Connect to FPGA GPIO (reserved) |
| 17 | N/A | Connect to FPGA GPIO (reserved) |
| 18 | GND | Ground |
| 19 | GND | Ground |
| 20 | UART_TX_P | Positive UART transmit data pin |
| 21 | UART_TX_N | Negative UART transmit data pin |
| 22 | UART_RX_P | Positive UART receive data pin |
| 23 | UART_RX_N | Negative UART receive data pin |
| 24 | 1PPS_P | Positive GPS 1PPS signal data pin |
| 25 | 1PPS_N | Negative GPS 1PPS signal data pin |
| 26 | Reserved | Reserved |
| 27 | Reserved | Reserved |
| 28 | N/A | Connect to FPGA GPIO (reserved) |
| 29 | N/A | Connect to FPGA GPIO (reserved) |
| 30 | Payload Power | Voltage determined by resistor option on PIP board |
| 31 | Payload Power | Voltage determined by resistor option on PIP board |
| 32 | GND | Ground |
| 33 | GND | Ground |
| 34 | N/A | Connect to FPGA GPIO (reserved) |
| 35 | N/A | Connect to FPGA GPIO (reserved) |
| 36 | Payload I2C SCL | I$^2$C interface between PIP board microcontroller and payload |
| 37 | Payload I2C SDA | I$^2$C interface between PIP board microcontroller and payload |

There are two available interfaces in this embodiment: a UART interface and an I$^2$C interface. Additional microcontroller interfaces (e.g., SPI, CAN, Ethernet, direct memory-mapping, etc.) may be available that can be used with a payload-specific PIP board. The available microcontroller interfaces may be routed to the FPGA and then be routed to unused pins in payload side payload interface connector 900, depending on FPGA programming.

It will be readily understood that the components of various embodiments of the present invention as claimed, as generally described and illustrated in the figures herein, may be arranged and designed in a wide variety of different configurations. Thus, the detailed description of the embodiments of the present invention, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A space vehicle system, comprising:
   a payload section, comprising:
      a payload interposer (PIP) board comprising a host side payload interface connector, a payload side payload interface connector, a microcontroller, and a field programmable gate array (FPGA) configured to route signals between the microcontroller, the host side payload interface connector, and the payload side payload interface connector, and
      a payload operably connected to the PIP board via the payload side payload interface connector; and
   a space vehicle comprising a PIP interface configured to interface with the host side payload interface connector, wherein
   the payload section is configured to connect to the space vehicle, and
   the host side payload interface connector of the PIP board is configured to connect to the PIP interface of the space vehicle.

2. The space vehicle system of claim 1, wherein the payload section further comprises:
   a PIP plate comprising an opening through which the payload side payload interface connector of the PIP board passes and interfaces with the space vehicle, the PIP plate facilitating connection between the space vehicle and the payload section.

3. The space vehicle system of claim 1, wherein electrical connections between the space vehicle and the payload are provided via the PIP board.

4. The space vehicle system of claim 1, wherein the PIP board is configured to provide a universal asynchronous receiver-transmitter (UART) interface, an I²C interface, or both, to the payload.

5. The space vehicle system of claim 1, wherein the space vehicle is configured to control power to the PIP board and the payload via a payload power enable line.

6. The space vehicle system of claim 1, wherein the microcontroller is configured to control the payload, format messages to the payload, format messages from the payload, and extract data for downlink.

7. The space vehicle system of claim 1, wherein the microcontroller comprises a plurality of interfaces that are made available to the payload.

8. The space vehicle system of claim 1, wherein the microcontroller is configured to perform file transfer and reprogramming operations without requiring an additional power draw from the payload.

9. The space vehicle system of claim 1, wherein the PIP board further comprises a host side safe-arm connector and the space vehicle further comprises a safe-arm interface, the host side safe-arm connector configured to connect to the safe-arm interface.

10. The space vehicle system of claim 1, wherein the PIP board further comprises:
    a debug universal asynchronous receiver-transmitter (UART) for the microcontroller; and
    a payload side safe-arm connector, wherein
    the debug UART facilitates development and testing of software of the microcontroller and appears on the payload side safe-arm connector so that the debug UART can be accessed while the space vehicle, the PIP board, and the payload are mated in flight configuration.

11. The space vehicle system of claim 1, wherein the host side payload interface connector of the PIP board comprises at least one general purpose input/output (I/O) pin, at least one command and data handling (CDH) universal asynchronous receiver-transmitter (UART) pin, at least one global positioning system (GPS) pin for interfacing with space vehicle GPS, a payload reset pin, and a plurality of power pins.

12. The space vehicle system of claim 1, wherein the payload side payload interface connector of the PIP board comprises at least one payload power pin, at least one universal asynchronous receiver-transmitter (UART) pin, and at least one global positioning system (GPS) pin.

13. A payload interposer (PIP) board, comprising:
    a host side payload interface connector configured to connect to a PIP interface of a space vehicle;
    a payload side payload interface connector configured to connect to a payload;
    a microcontroller; and
    a field programmable gate array (FPGA) configured to route signals between the microcontroller, the host side payload interface connector, and the payload side payload interface connector, wherein
    the PIP board is configured to provide an interface between the space vehicle and the payload.

14. The PIP board of claim 13, wherein the microcontroller is configured to control the payload, format messages to the payload, format messages from the payload, and extract data for downlink.

15. The PIP board of claim 13, wherein the PIP board further comprises:
    a payload side safe-arm connector; and
    a debug universal asynchronous receiver-transmitter (UART) for the microcontroller, wherein
    the debug UART facilitates development and testing of software of the microcontroller and appears on the payload side safe-arm connector so that the debug UART can be accessed while the space vehicle, the PIP board, and the payload are mated in flight configuration.

16. The PIP board of claim 13, wherein the host side payload interface connector comprises at least one general purpose input/output (I/O) pin, at least one command and data handling (CDH) universal asynchronous receiver-transmitter (UART) pin, at least one global positioning system (GPS) pin for interfacing with space vehicle GPS, a payload reset pin, and a plurality of power pins.

17. The PIP board of claim 13, wherein the payload connector comprises at least one payload power pin, at least one universal asynchronous receiver-transmitter (UART) pin, and at least one global positioning system (GPS) pin.

18. A payload section, comprising:
    a payload interposer (PIP) board comprising a host side payload interface connector, a payload side payload interface connector, a microcontroller, and a field programmable gate array (FPGA) configured to route signals between the microcontroller, the host side payload interface connector, and the payload side payload interface connector;
    a PIP plate comprising an opening through which the host side payload interface connector of the PIP board passes and interfaces with a space vehicle, the PIP plate facilitating connection between the space vehicle and the payload section; and
    a payload operably connected to the PIP board via the payload side payload interface connector.

* * * * *